United States Patent [19]

Anderson

[11] Patent Number: 4,548,305

[45] Date of Patent: Oct. 22, 1985

[54] TORQUE OVERLOAD RELEASE COUPLING

[75] Inventor: Conrad V. Anderson, Minneapolis, Minn.

[73] Assignee: Zero-Max Industries, Incorporated, Minneapolis, Minn.

[21] Appl. No.: 456,181

[22] Filed: Jan. 6, 1983

[51] Int. Cl.⁴ ............................................. F16D 43/20
[52] U.S. Cl. ..................................... 192/56 R; 464/36
[58] Field of Search ................... 192/56 R; 464/36, 35

[56] References Cited

U.S. PATENT DOCUMENTS

| Re. 25,274 | 10/1962 | Hayes | 192/56 R |
|---|---|---|---|
| 2,966,973 | 1/1961 | Hayes | 192/56 R |
| 3,032,156 | 5/1962 | Eriksson | 192/56 R |
| 3,034,623 | 5/1962 | Amtsberg | 192/56 R |
| 3,080,029 | 3/1963 | Stober | 192/56 R |
| 3,103,999 | 9/1963 | Rabinow et al. | 192/56 R |
| 3,194,370 | 7/1965 | Bennett | 192/56 R |
| 3,203,523 | 8/1965 | Gilder et al. | 192/56 R |
| 3,205,985 | 9/1965 | Pearl | 192/56 R |
| 3,292,754 | 12/1966 | Peterson | 192/56 R |
| 3,319,753 | 5/1967 | Orwin et al. | 192/56 R |
| 3,405,789 | 10/1968 | Orwin et al. | 192/56 R |
| 3,405,790 | 10/1968 | Orwin et al. | 192/56 R |
| 3,429,407 | 2/1969 | Orwin et al. | 192/56 R |
| 3,547,242 | 12/1970 | Braggins | 192/56 R |
| 3,561,576 | 2/1971 | Lutz | 192/56 R |
| 3,640,092 | 2/1972 | Neal et al. | |
| 3,653,226 | 4/1972 | Westbury | |
| 3,720,077 | 3/1973 | Jackson et al. | |
| 3,722,644 | 3/1973 | Steinhagen | 192/56 R |
| 3,774,738 | 11/1973 | Steinhagen | 192/56 R |
| 3,893,553 | 7/1975 | Hansen | 192/56 R |
| 4,007,818 | 2/1977 | Orwin | 192/56 R |
| 4,199,964 | 4/1980 | Grey | 192/56 R X |
| 4,255,946 | 3/1981 | Hansen | 192/56 R X |
| 4,284,374 | 8/1981 | Senzaki | 192/56 R X |
| 4,294,340 | 10/1981 | Kunze | 192/56 R |
| 4,311,224 | 1/1982 | Kato et al. | 192/56 R |

FOREIGN PATENT DOCUMENTS

| 2377061 | 9/1978 | France | 192/56 R |
|---|---|---|---|
| 9886/71 | 3/1971 | Japan | 192/56 R |

Primary Examiner—George H. Krizmanich
Attorney, Agent, or Firm—Milton E. Gilbert; Gary E. Ross

[57] ABSTRACT

A torque overload release clutch comprises an input, intermediate and output assemblies drivingly interconnected for rotation. A plurality of spline balls interconnects the input assembly with the intermediate assembly. A plurality of main balls disengagably, drivingly interconnects the intermediate assembly to the output assembly. Helical springs provide a reference force. When the axial force due to the applied torque exceeds the reference force, the main balls pivot and rotate so as to disengage the intermediate assembly from the output assembly by kicking the intermediate assembly axially. A latch comprising a dilating ring of balls can maintain the intermediate assembly in the disengaged position. Further, the latch balls can assume an intermediate position between the engaged and disengaged positions which facilitates resetting of the clutch.

48 Claims, 19 Drawing Figures

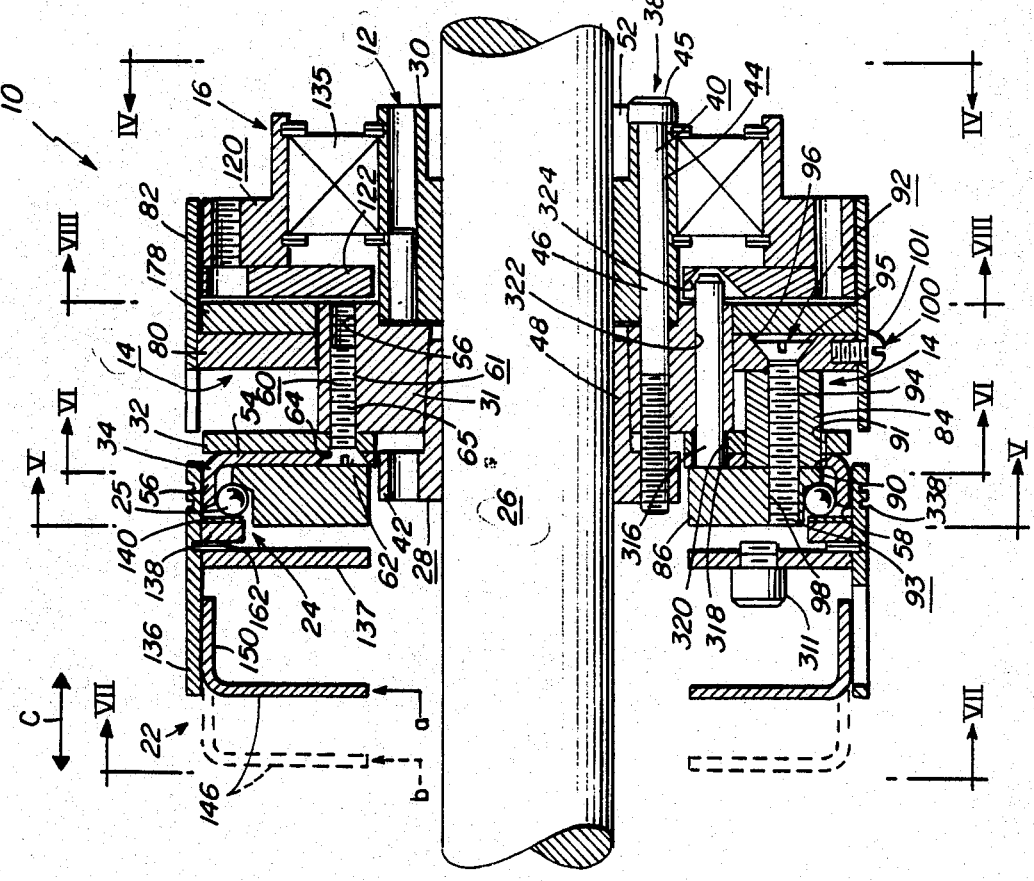

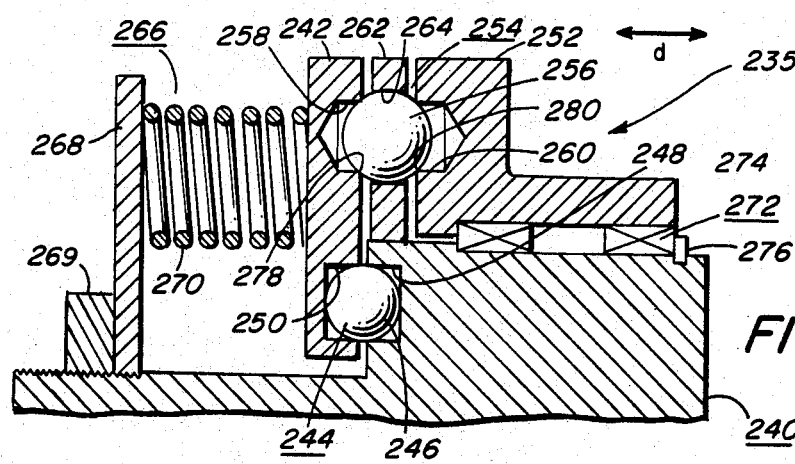
FIG. 11
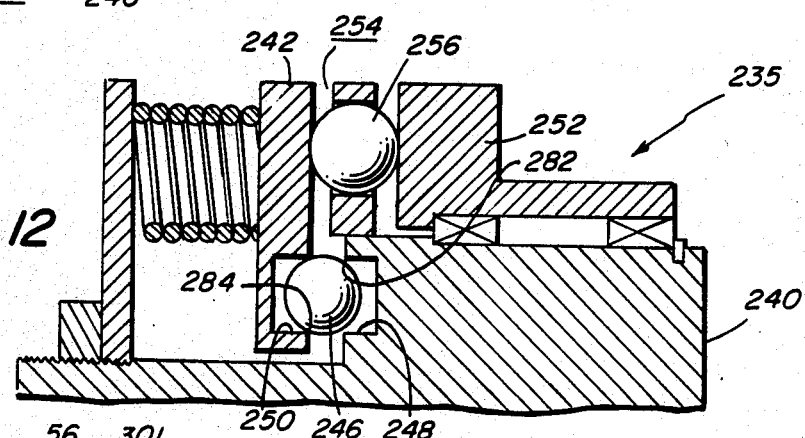
FIG. 12
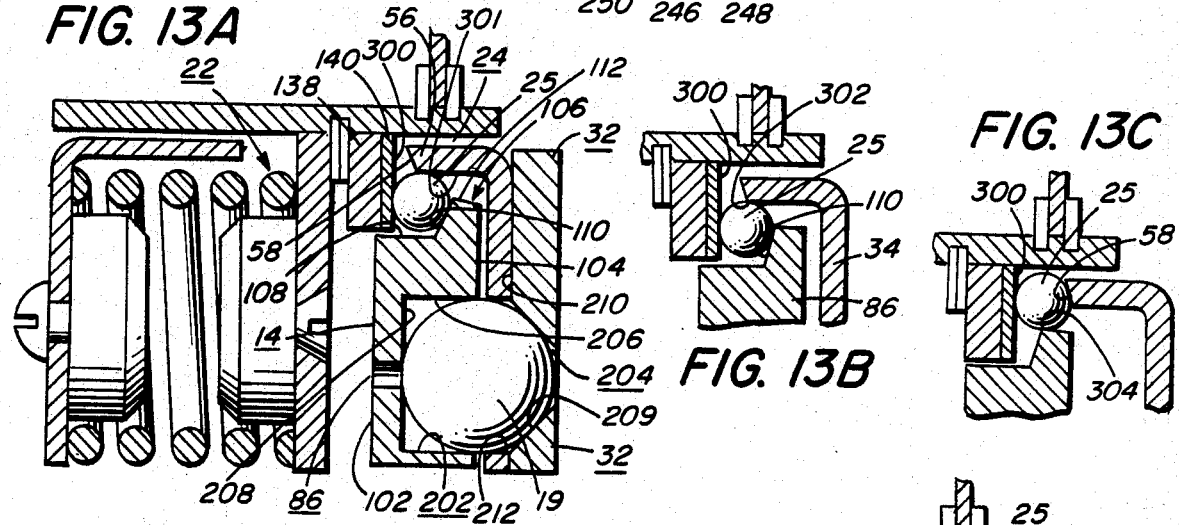
FIG. 13A
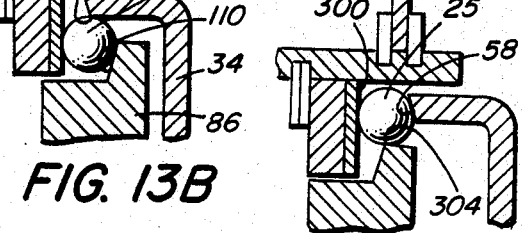
FIG. 13C
FIG. 13B
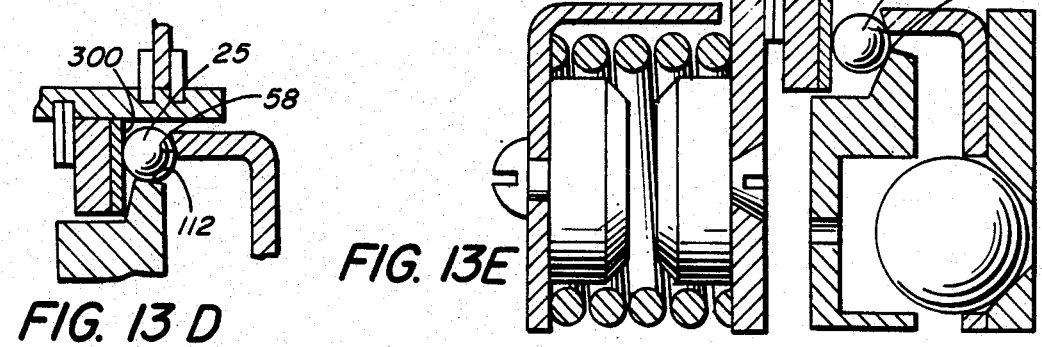
FIG. 13D
FIG. 13E

TORQUE OVERLOAD RELEASE COUPLING

BACKGROUND AND SUMMARY OF THE INVENTION

The present invention relates generally to an improved clutch of the type known as a torque limiter, mechanical fuse, or torque overload release clutch. Generally such clutches perform safety and protection functions in that they, prevent transmission of torque from a first device to a second device when the torque is above a set magnitude called the "trip" torque, while drivingly interconnecting said devices below said trip torque. The inventor has discovered that the trip torque at which the clutch disengages the devices, for most prior art clutches of this type, is a variable dependent jointly on the level of torque applied and the number of rotations at said level. This dependence can be called Kinematic sensitivity. He has further discovered that reducing frictional losses within the clutch can reduce the effects of this dependence.

An object of the present invention is to provide a torque overload release clutch which has a manually selectable level of trip torque and which exhibits lesser Kinematic sensitivity.

A further object is to provide such a clutch which can react to an applied overload torque in either direction, as well as accommodate rotation in either direction.

A still further object of the present invention is to provide such a clutch which requires reduced force during its manual reset or which is alternatively capable of being automatically reset.

These and other objects of the present invention are met in a torque overload release clutch comprising a first assembly, an intermediate assembly, a second assembly, first interconnecting means for drivingly interconnecting the first assembly and the intermediate assembly, said first means including a plurality of balls disposed therebetween, second interconnecting means for drivingly interconnecting the intermediate assembly with the second assembly comprising a plurality of balls disposed therebetween, means for generating a reference force and applying said reference force to said second interconnecting means, wherein the first, intermediate and second assemblies and the first and second means together operatively form a drive train for transmitting torque between the first and second assemblies when the intermediate assembly is in its engaged position, and wherein the intermediate assembly is adapted to move axially to a disengaged position thereby disabling the second means when the axial force due to the torque applied to the second means exceeds the reference force applied thereto and thereby interrupting the transmission of torque between the first and second assemblies.

According to a further aspect of the invention, the torque overload release clutch further includes latch means for maintaining the intermediate member in its disengaged position. According to a preferred embodiment, the latch means includes a dilating ring of latch balls which (i) interconnect the force generating means and the intermediate assembly, thereby transmitting the reference force therebetween when the intermediate assembly is in its engaged position, and (ii) interconnect the force generating means and the first assembly thereby transmitting the reference force therebetween when the intermediate assembly is in its disengaged position.

According to yet a further aspect of the invention, the ring of latch balls can assume an intermediate position in which the reference force is transmitted in parallel to both the first assembly and the intermediate assembly so as to facilitate resetting of the clutch after disengagement.

The above and other aspects of the invention, including various novel details of construction and combination of parts will now be more particularly described with reference to the accompanying drawings. It will be understood that the particular device embodying the invention is shown by way of illustration only and not as a limitation on the scope of the invention. The principles and aspects of this invention may be employed in various and numerous embodiments without departing from the scope of the invention.

BRIEF DESCRIPTION OF THE DRAWINGS

For a fuller understanding of the nature of the present invention, reference should be had to the accompanying drawings, wherein:

FIG. 2 is a composite sectional view taken along lines II—II of FIGS. 4 through 8;

FIG. 3 is a composite sectional view taken along line III—III of FIGS. 4 through 8;

FIG. 11 is an illustrative conceptual view in section of a subassembly of a simpler embodiment of the invention in its engaged position;

FIG. 12 is an illustrative conceptual view in section of the subassembly shown in FIG. 11 in its disengaged position.

FIGS. 13A-13E are sectional views of the latch means and associated structure of the clutch shown in FIG. 1 in various positions during engagement, disengagement and reset of the clutch;

DESCRIPTION OF THE PREFERRED EMBODIMENT

Figures 1, 6:
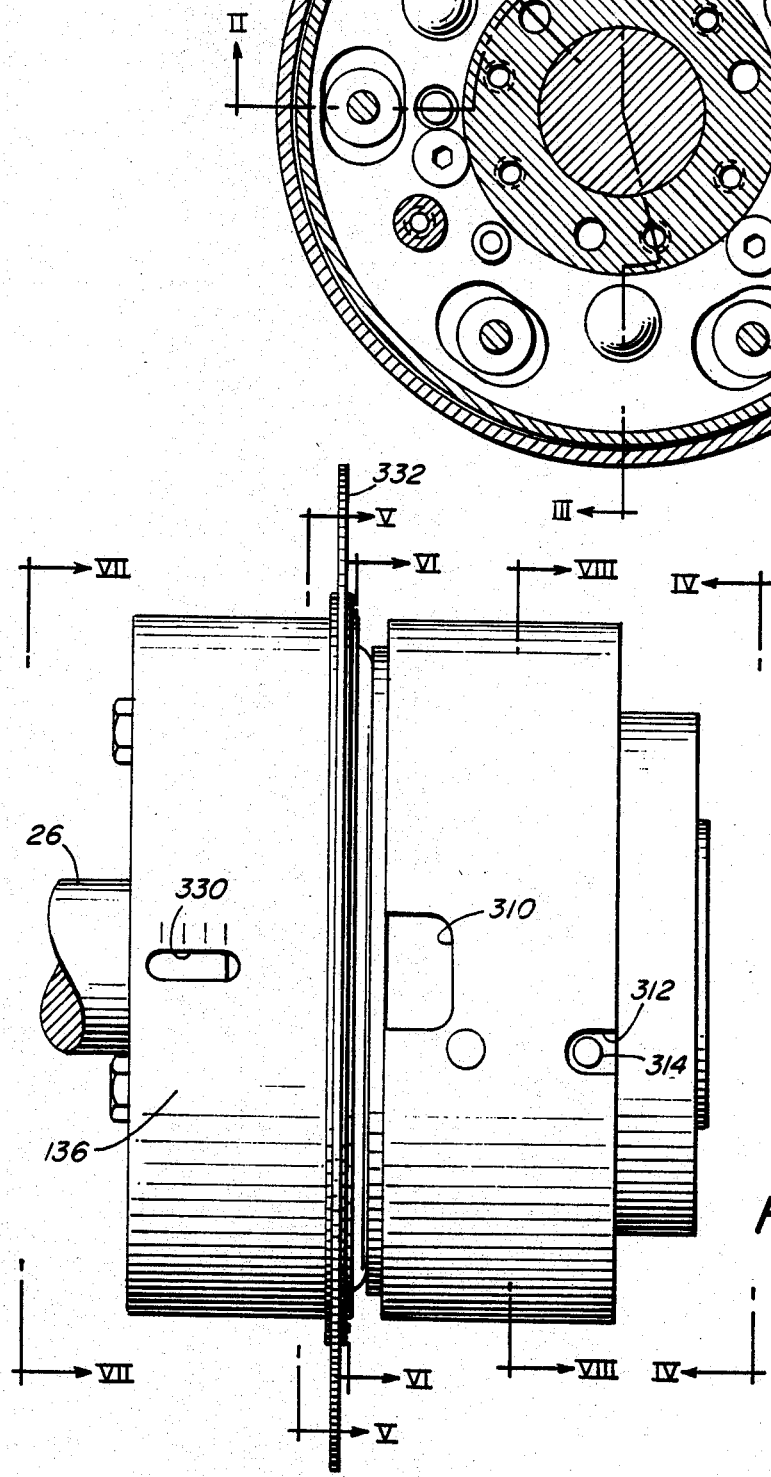
FIG. 1 is an elevational view of a torque overload release clutch made in accordance with the present invention.
FIG. 6 is a sectional view with the bushing removed taken along line VI—VI of FIG. 1, this line's location also being indicated in FIGS. 2 and 3.

In the figures like reference numbers refer to similar features of the invention. Throughout the following detailed description, reference should be had to FIG. 2 which, when viewed together with other figures specifically referred to hereinbelow in the text will provide a full and enabling appreciation of the various features of the preferred embodiment of the invention and the principles by which it operates.

As can be seen in FIGS. 2 and 3, the clutch 10 includes a hub assembly 12, and intermediate assembly 14 and a power take-off assembly 16. These assemblies are operationally interconnected so as to form a rotational drive train while the clutch is operating below a set torque in its engaged position and to not transmit torque from the hub assembly 12 to the power take-off assembly 16 above said set torque.

The hub assembly 12 is interconnected with the intermediate assembly 14 by spline means 18 (see FIG. 3) including a plurality of spline balls 19, and the intermediate assembly 14 is releasably interconnected with the power take-off assembly 16 by the force comparing means 20 (see FIG. 3) which includes a plurality of main balls 21.

Additionally, the clutch includes means 22 for generating a reference force having a manually adjustable magnitude, and a multi-positionable latch means 24 comprising a radially expandable ring concentrically disposed about shaft 26 and preferably defined by a plurality of latch balls 25. The latch balls 25 transmit the reference force, in a first position to the intermediate assembly 14 which, in turn, transmits it to the force comparing means 20. In a second position of the latch means 24 the reference force is transmitted directly to the hub assembly 12. In a third position of the latch means 24 the reference force is split so as to be applied to both the intermediate assembly 14 and the hub assembly 12.

In a typical operation of the clutch 10 serving as a drive train, torque is applied to the hub assembly 12 via a torque transmitting means such as the shaft 26 which is caused to rotate by a prime mover (not shown) and is transmitted through the spline means 18 to the intermediate assembly 14 and, in turn, to the force comparing means 20 and thereafter to the power take-off assembly 16 which is connectable to torque receiving means such as a sprocket, pulley, flange or coupling (not shown) to which the torque is to be applied.

When the axial force due to the applied torque exceeds the reference force applied to the force comparing means 20, it no longer drivingly interconnects the power take-off assembly 16 and the intermediate assembly 14. Thus, above a set torque, known as the "trip" torque for the clutch 10 (which is set by adjusting the magnitude of the reference force) torque is not transmitted through the clutch 10 from the shaft 26 to the torque receiving means. This interruption in torque transmission continues until the clutch 10 is reset, manually or automatically, as described hereinafter.

In accordance with the invention, this disengagement is accomplished both by a relative rotational movement ("swing") of the assemblies 12, 14, and 16 as well as by a relative axial movement ("kick") of the intermediate assembly 14.

In order to understand the operation of the present invention it is necessary to first more fully detail the various elements, features and structures which shall be grouped for purposes of description and to facilitate understanding, but not by way of limitation on the nature or scope of the invention. While an element, feature or structure may be described under a certain heading, it may relate to, or also be, appropriately grouped with elements, features and structures described under a different heading. It is further to be understood that some elements, features and structures serve multiple purposes as shall be described hereinbelow.

THE HUB ASSEMBLY 12

The hub assembly 12 includes a bushing 28, nose 30, hub 31, backing plate 32, latch cup 34, and stand-offs 36.

Bushing 28, for example, is a tapered bushing interference fitted or otherwise rotationally-rigidly attached to the shaft 26. The bushing 28 is secured to the rest of the hub assembly 12 by means 38, comprising, for example, a plurality of screws 40, shown in FIG. 3, each having a head portion 41 abutting flange portion 42 of the bushing 28 and axially-extending shank portion 43 which threadedly connects to the hub 31. Alternatively, the bushing 28 can, for example, be attached to the hub assembly 12 as shown in FIG. 2 by a plurality of screws 44 each having a head portion 45 abutting against the nose 30 and a shank portion 46 extending axially and threadedly engaging the bushing's flange portion 42.

The hub 31 is an annulus disposed concentrically about the axially-extending portion 48 of the bushing 28. The hub 31, for example, is interconnected axially to the nose 30. (Alternatively, these parts may be, for example, of one piece construction.) As shown, the hub 31 is secured to the nose 30 via securing means 50 (see FIG. 3) such as bolts or screws which extend from the nose 30 into and threadedly engaging the hub 31.

Figure 4:
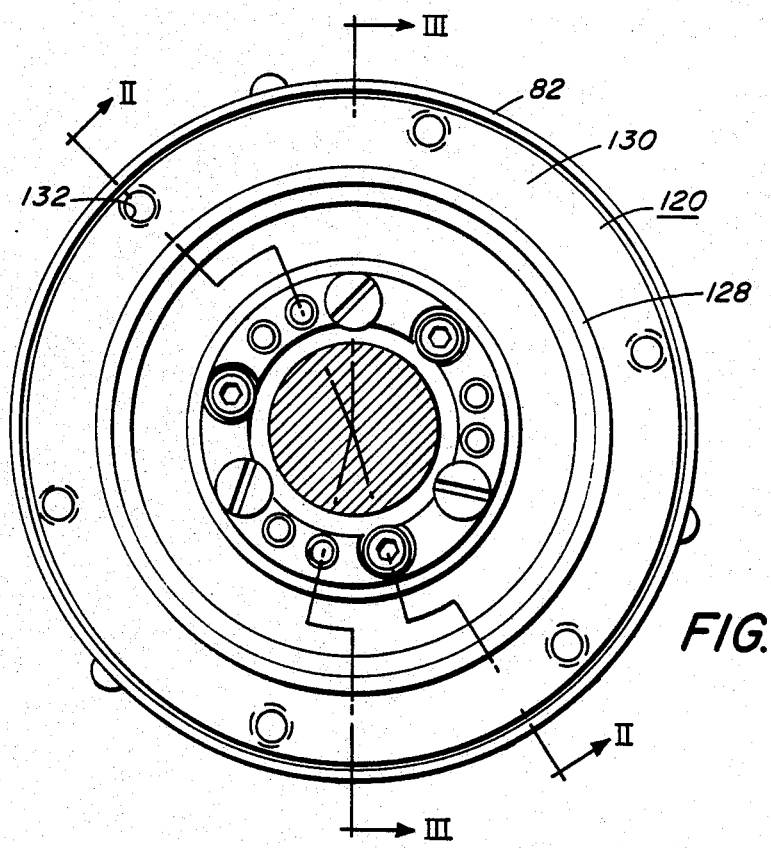
FIG. 4 is a sectional view taken along line IV—IV of FIG. 1, this line's location also being indicated in FIGS. 2 and 3.

As can be seen in FIGS. 2, 3 and 4, the nose 30 is an annulus disposed concentrically about the shaft 26 axially adjacent to the bushing 28. The nose 30 optionally may be provided with a recess 52 disposed on its inner diameter which is sized and configured to receive a support bushing (not shown) which finds utility if a shaft 26 is used of a smaller diameter than the inside diameter of the nose 30.

The backing plate 32 is a radially-extending annulus concentrically disposed about the shaft 26.

The latch cup 34 is an annulus disposed axially adjacent to and abutting the backing plate 32 and concentrically about the shaft 26. The latch cup 34 includes a radially-extending portion 54 and an axially-extending portion 56 directed away from the backing plate 32. Preferably portions 54, 56 are integrally constructed. Distal end 58 (see FIG. 13A) of the latch cup 34 is inclined at an angle of 15°-23° (preferably 20°) in a direction towards the backing plate 32 and the shaft 26. Securing means 60 (FIG. 2) connects the latch cup 34 and the backing plate 32 to the hub 31. Securing means 60, for example, includes a plurality of retaining screws 61 each having a head portion 62 received in a countersunk bore 64 in the latch cup 34, and a cylindrical portion 65 threadedly extending through the backing plate 32 and threadedly engaging a bore 66 in the hub 31.

The plurality of stand-offs 36 (see FIG. 3) each comprise a right cylindrical tube internally threaded to receive adjusting means 67 such as screw 68 at one of its ends, and at its other end securing means 70 by which the stand-offs 36 are secured to the backing plate 32. The securing means 70 as will be appreciated by one skilled in the art, for example, can include a bolt having its head portion 74 received in a counter-sunk hole 76 in the backing plate 32 and its shank portion 78 (FIG. 5) extending axially into and threadedly engaging internally one of the stand-offs 36.

INTERMEDIATE ASSEMBLY 14

The intermediate assembly 14 includes a swing plate 80, a reset sleeve 82, a plurality of legs 84, and a latch plate 86.

The swing plate 80 is a radially-extending annulus disposed in radially-spaced relation to and concentrically about the shaft 26.

The latch plate 86 as shown in FIGS. 2, 3, 5 and 13A-13E is a radially-extending annulus disposed in radially-spaced relation to and concentrically about the shaft 26. Referring specifically to FIG. 13A, the latch plate 86 includes side walls 102 and 104 and a configured radially-outer wall 106 radially remote from the shaft 26 after assembly. The wall 106 includes an axially-extending surface 108, a first inclined surface 110 extending from the axially-extending surface 108 in a direction radially outward and toward the backing plate 32 at an angle of 15° to 23°, preferably the same angle as that of the distal end 58 though of opposite slope. The first inclined surface 110 is joined by a second inclined surface 112 which extends therefrom in the direction towards the shaft 26 and the backing plate 32 at an angle of approximately and preferably no less than 8°.

Figure 5:
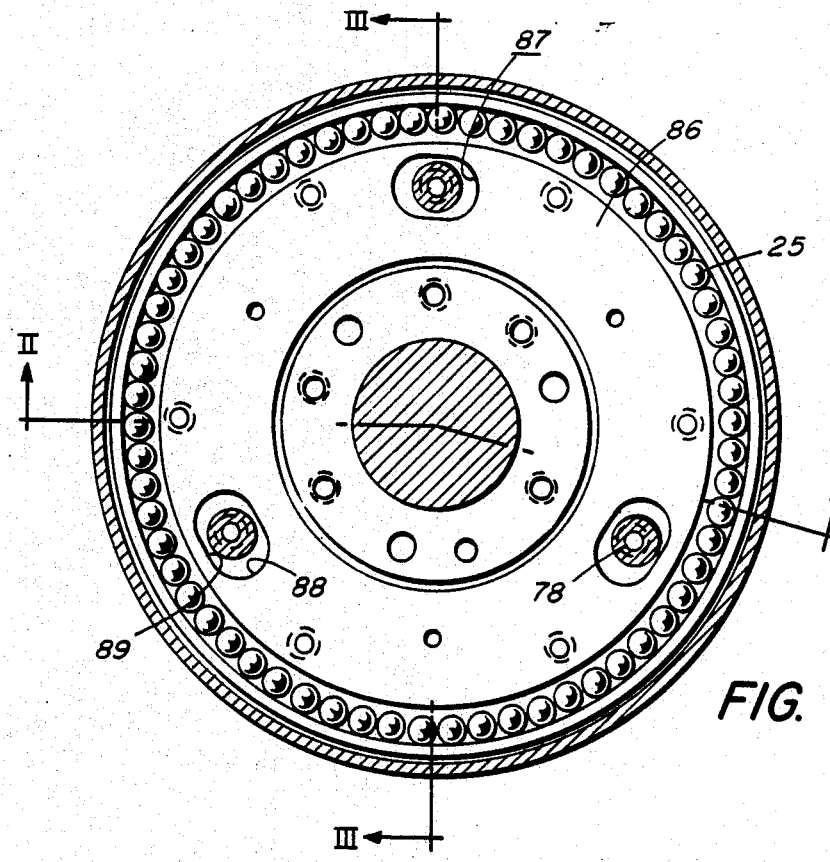
FIG. 5 is a sectional view with the bushing removed taken along line V—V of FIG. 1, this line's location also being indicated in FIGS. 2 and 3.

As can best be seen in FIG. 5, the latch plate 86 includes a plurality of elongate openings 87 each of which receives therethrough with a clearance fit one of the stand-offs 36. Referring to openings 87 as examples, an elongate opening as that term is used throughout this specification means a bore having two frusto-cylindrical end walls 88 tangentially joined by planar side walls 89.

The latch plate 86 is connected to the swing plate 80 by the plurality of legs 84 which extend in a generally axial direction, are circumferentially spaced one from another, are each in the form of a right cylindrical, hollow tube and are each disposable with a clearance fit through registered elongate openings 90, 91 in the radially-extending portion 54 of the latch cup 34 (see also FIG. 6) and the backing plate 32, respectively. Securing means 92 interconnect the latch plate 86 and the swing plate 80 and, for example, include a plurality of screws 93 each having a shank portion 94 extending through one of the legs 84. Each screw 93 has a head portion 95 receivable in a counter-sunk hole 96 in the swing plate 80 and a threaded shank portion 94 threadedly engaging a bore 98 in the latch plate 86.

The reset sleeve 82 is an axially-extending thin-walled, right cylindrical tube which is connected to the rest of the intermediate assembly 14 which it surrounds by securing means 100, for example, including a plurality of fastening screws 101 which attach it to the swing plate 80.

POWER TAKE-OFF ASSEMBLY 16

The power take-off assembly 16 includes a power take-off flange 120, a cam plate 122, and biasing means 124.

The cam plate 122 (shown in FIGS. 3 and 8) is a radially-extending annulus disposed in spaced concentric relation about the nose 30. Cam plate 122 is also disposed in spaced parallel relation to the swing plate 80. The swing plate 80 and cam plate 122 each include axially-extending recesses 114 and 116, respectively, in their opposing surfaces 117, 118, respectively. The recesses 114 and 116 are angularly and radially registered and sized so as to each be able to receive therein a portion (less than half) of the main balls 21.

While recess 114 is a blind opening extending into the swing plate from surface 117 orthogonally and ending, for example, in a conical end wall 119, recess 116 is shown as a through-bore. Recesses 114, 116 also form a part of the force comparing means 20 described below.

The flange 120 shown in FIGS. 2 and 4 includes an axially-extending portion 128 and a portion 130 (see FIG. 4) radially extending outward therefrom toward the reset sleeve 82. The flange 120 preferably is of an integral construction. The portion 130 of the flange 120 further includes a plurality of threaded bores 132 (see FIG. 4) or other means for mounting the torque-receiving device.

Referring to FIG. 3, the flange 120 is connected to the cam plate 122 by securing means such as pins, screws or bolts, with screws being shown at 134. The axially-extending portion 128 is operatively connected to the hub assembly 12, preferably radially to the nose 30, through bearing means such as a sealed ball bearing 135 on which it can rotate with insubstantial friction ("float").

REFERENCE FORCE GENERATING MEANS 22

The reference force generating means 22 includes a housing sleeve 136, spring plate 137, spacers 138, 140, latch means 24, biasing means 144 (see FIGS. 3 and 9), and adjusting cup 146.

Figure 7:
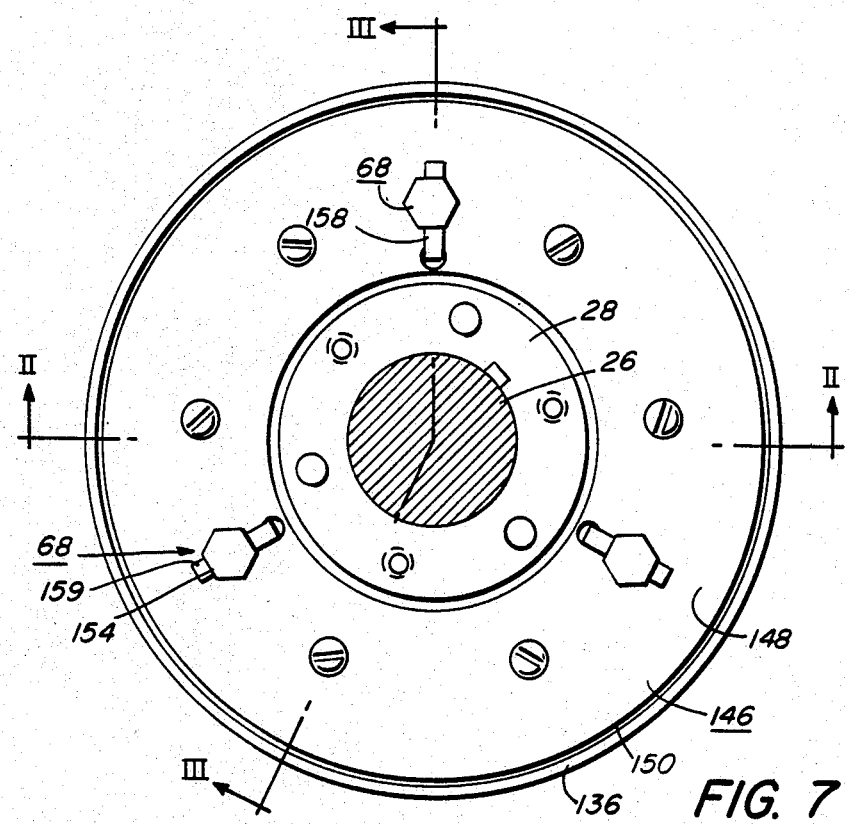
FIG. 7 is a sectional view taken along line VII—VII of FIG. 1, this line's location also being indicated in FIGS. 2 and 3.

As shown in FIGS. 2, 3, and 7, the adjusting cup 146 is an annulus disposed in radially-spaced relation to and concentric with shaft 26, having a radially-extending portion 148 and an axially-extending portion 150, and connected to the stand-offs 36 by the adjusting means 68. The adjusting means 68 includes, for example, and as shown in FIG. 3, a plurality of screws 152 each of which includes a head portion 154 which abuts against portion 148, and a shank portion 156. Means such as a lock washer 158 (with bendable locking tabs 159) disposed between each head portion 154 and portion 148 can be used to prevent undesired loosening of each of the screws 152. The shank portion 156 extends through the lock washer 158 and through a bore 160 in the radial-extending portion 148 of the adjusting cup 146, and is threadedly received within the stand-offs 36. The adjusting cup 146 is adapted to translationally move axially relative to the swing plate 80 between position "a" and position "b" (shown in phantom in FIG. 2) as means 67 is adjusted, e.g., as screws 152 are turned.

The housing sleeve 136 is a axially-extending thin-walled right cylindrical tube disposed concentrically about the axially-extending portion 150 of the adjusting cup 146.

The spring plate 137 is an annulus disposed in radially-spaced relation to and concentric about shaft 26, extending parallel and in spaced relation to the radially-extending portion 148 of the adjusting cup 146. So too are the spacers 138 and 140.

The spacers 138, 140 are separated from the spring plate 137 by retaining ring 162 and are disposed on the axially opposite side of the spring plate 137 from the radially-extending portion 148 of the adjusting cup 146. The retaining ring 162, together with the latch balls 25, axially contain the spacers 138, 140. Spacer 138, for example, is a relatively thick, soft washer, while spacer 140 is a relatively thin, hard washer. Alternatively, the spacers 138, 140 can be of one-piece construction (not shown) as will be appreciated from their function described below.

Figure 9:
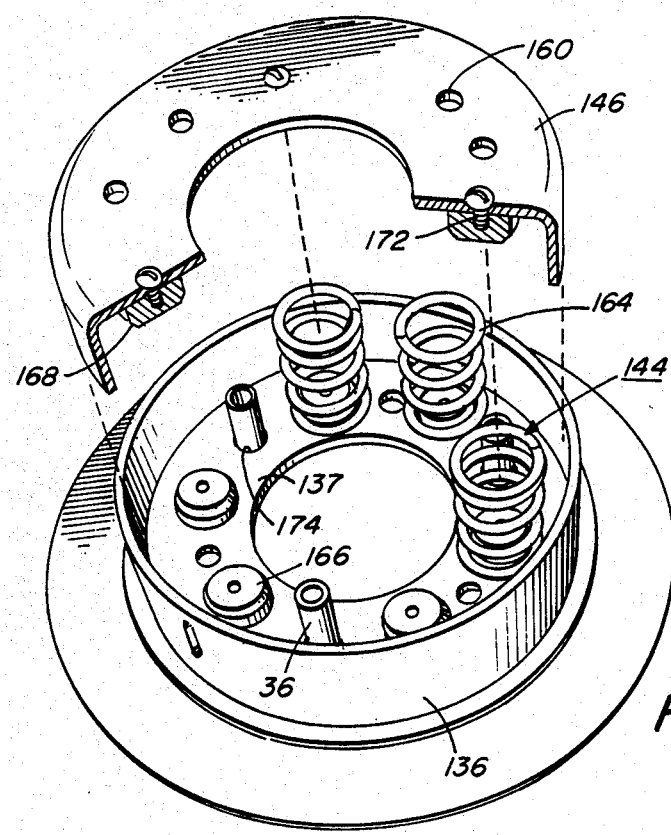
FIG. 9 is a perspective view of a subassembly of the clutch shown in FIG. 1 specifically visually detailing part of the force generating means and associated structure.

As can be seen in FIG. 9, disposable between the spring plate 137 and the adjusting cup 146 are a plurality of helical compression springs 164 which preferably comprise the biasing means 144. The helical springs 164 are each disposed on first and second spring pilots 166 and 168. The pilots 166 and 168 are secured to the spring plate 137 and the adjusting cup 146, respectively, by securing means such as screws 170 and 172, respectively.

The helical compression springs 164 are circumferentially spaced each at the same radial distance from shaft 26. While provision is made for six springs (three are shown) in the preferred embodiment it should be understood that any number capable of providing a sufficient magnitude of reference force are within the purview of the invention. Also, shown in this FIG. 9 are the stand-offs 36, the bores 160 in the adjusting cup 146, the housing sleeve 136, and bores 174 in the spring plate 137 which receive therethrough the stand-offs 36 with a clearance fit.

It should be readily understood from the description above that the reference force generated by the means 22 can be adjusted by means 67, for example, by a tightening or loosening of the screws 68 which effectuates an increase or decrease, respectively, in the compression of the helical springs 164 which, in turn, increases or decreases, respectively, the reference force applied to the spring plate 137. The invention contemplates a further modification of the reference force by the removal of some of the helical springs 164. For example, every other spring can be removed so as to halve the reference force applied to the spring plate 137 at a certain adjustment of the adjusting means 68.

FORCE COMPARING MEANS 20

The force comparing means 20 includes the main bearing balls 21, cage 178, and the recesses 114, 116.

The cage 178 is a radially-extending annulus disposed axially between the swing plate 80 and the cam plate 122 and in radially-spaced concentric relation to shaft 26. It includes a plurality of circumferentially-spaced through-bores 180 (shown in FIGS. 3 and 14) sized to receive the main balls 21 with a clearance fit. The main balls 21 are disposed in the through-bores 180 as well as in the recesses 114 and 116 so as to be mechanically contained thereby.

The main balls 21 and the recesses 114 and 116 form a cam system sized and configured to permit during relative rotation between the hub assembly 12 and the power take-off assembly 16 first a rolling and then (due also to their interaction with other parts described below) a sliding action of each of the main balls 21 about its associated edges 182, 184, respectively, of the recesses 114, 116. These edges 182, 184 are "sharp" edges approximating a square corner. Edges 182, 184 are sized and spaced axially and main balls 21 are sized and coact with the edges 182, 184 on which they ride so as to form during engagement a cam angle of approximately 25° with respect to a plane directed perpendicular to the shaft 26. The main balls 21 rotate during disengagement as the cam angle increases until it reaches approximately 65° for the manual reset embodiment or approximately 45° for the automatic reset embodiment (detailed and contrasted further below), at which point the edges 182, 184 are in contact with the associated one of the main balls 21 at points 180° apart. Beyond this respective cam angle, the main balls 21 slide.

Figure 10:
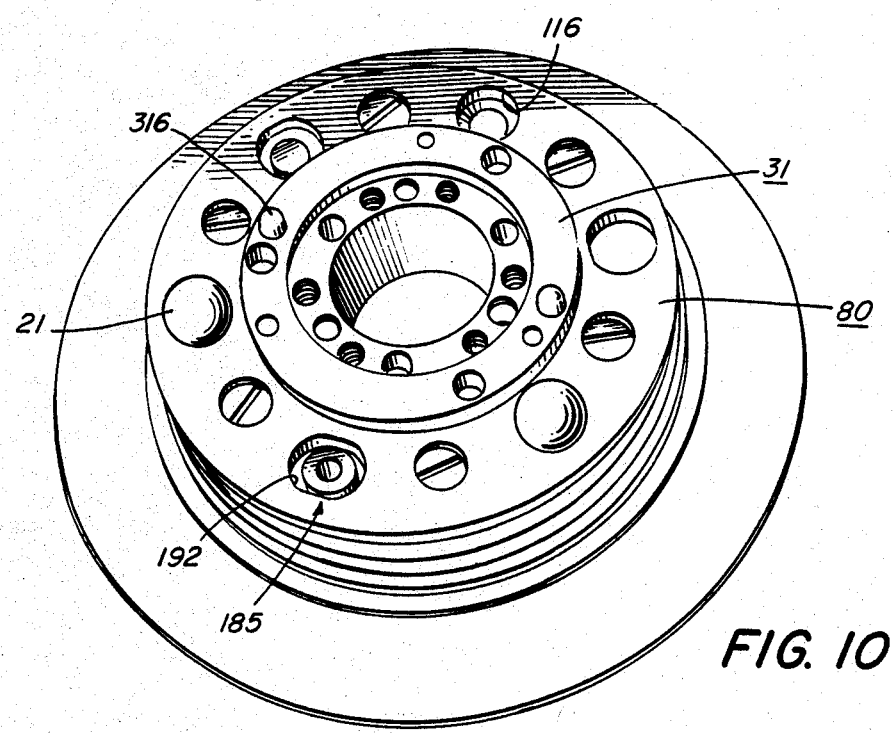
FIG. 10 is a perspective view of a further subassembly of the clutch shown in FIG. 1 specifically visually detailing a part of the force comparing means and associated structure.

FIG. 10 shows a subassembly of clutch 10 with main balls 21 resting in their associated recesses 114 in the swing plate 80. Also to be seen in this view are the hub 31 and a plurality of cage stop means 185.

Figure 14:
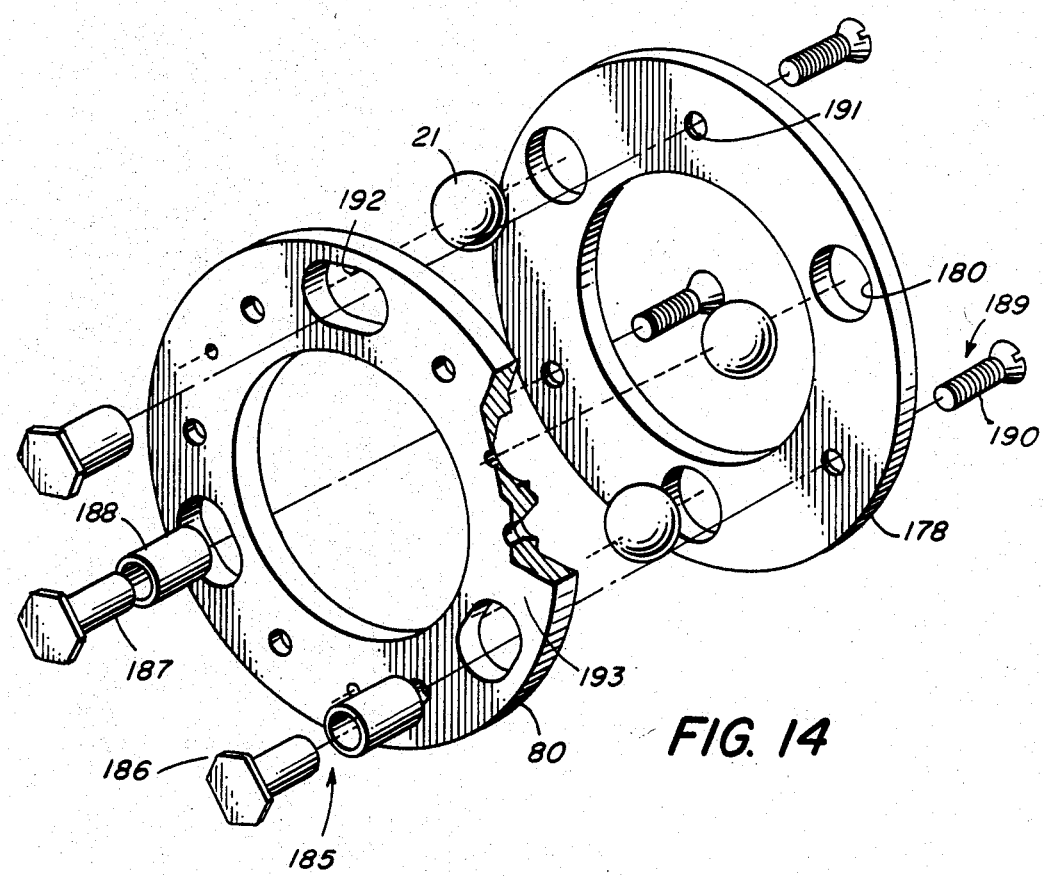
FIG. 14 is an exploded view of a further subassembly of the invention specifically visually detailing the automatic reset means and associated structure.

With reference to the exploded view of FIG. 14, each cage stop means 185 includes a head portion 186 and a hollow cylindrical shank portion 187 connected thereto. For automatic resetting, sleeve 188 in the form of a thin-walled tube is disposed over the shank portion 187. Retaining means 189 including, for example, screw 190 is receivable through counter-sunk hole 191 in the cage 178 and into threaded engagement with the cylindrical shank portion 187 which is internally threaded. The shank portion 187 extends through an elongate opening 192 in the swing plate 80. The radial width of the elongate opening 192 is less than the diameter of the head portion but greater than the diameter of the sleeve 188. The operation of the cage stop means 185 shall be more fully discussed below under the heading "RESET".

SPLINE MEANS 18

The spline means 18, shown in FIG. 3 and FIGS. 13A through 13E, includes a plurality (three are shown) of spline balls 19, the backing plate 32, the latch cup 34, as well as the latch plate 86 insofar as the spline balls 19 are contained in and coact with these latter parts of the clutch 10.

Referring to FIG. 13A, the spline balls 19 are disposed between the latch plate 86 and the backing plate 32 within a plurality of recesses 202 and 204 (each recess 202 coaxial with an associated one of the plurality of recesses 204). Each of the recesses 202 is in the form of a cylindrical blind hole disposed within side wall 104 of the latch plate 86 which confronts the latch cup 34. Each of the recesses 202 includes a cylindrical side wall 206 and radially-extending circular end wall 208, and is sized so as to have a diameter approximately equal to that of, and an axial depth from surface 104 to end wall 208 approximately equal to the radius of, each of the spline balls 19. Thus, one of the spline balls 19 is partially receivable therein with a clearance fit. Each of the recesses 204 includes a frusto-conical surface 209 and extends axially through the surface 210 of the backing plate 32. Disposed axially between each of the associated recesses 202, 204 and in axial and angular registration therewith (when the intermediate assembly 14 is in its engaged position) is one of a plurality of through-bores 212 in the latch cup 34 having a diameter such that it can receive one of the spline balls 19 therethrough with a clearance fit.

OPERATION OF THE SPLINE MEANS 18 AND FORCE COMPARING MEANS 20

Digressing from the preferred embodiment so far described, the operation of a torque overload release clutch embodying the present invention can be understood from the simplified conceptual illustrations shown in FIGS. 11 and 12.

FIG. 11 shows a further embodiment of a clutch 235 made in accordance with certain aspects of the present invention, said clutch being shown in FIG. 11 in its engaged position, while FIG. 12 shows it in its disengaged position. It should be understood that the intermediate assembly 242 moves axially (in the directions indicated by arrows "d") between these two positions.

In the FIGS. 11 and 12 a first member 240 is operatively and drivingly connected for rotation with an intermediate member 242 by spline means 244 comprising a plurality of spline balls 246 disposed in registered recesses 248 and 250 in the first member 240 and the intermediate member 242, respectively. A second member 252 is operatively and drivingly connectable to the intermediate member 242 by force comparing means 254 comprising a plurality of main balls 256 disposed in associated ones of a like number of registered recesses 258, 260 in the intermediate member 242 and the second member 252, respectively. The force comparing means 254 further includes cage 262 disposed between the intermediate member 242 and the second member 252 and having a bore 264 therethrough coaxial with registered recesses 258 and 260 and being sized so as to receive one of the main balls 256 therethrough with a clearance fit. A force generating means 266 includes an adjusting plate 268 spaced from the intermediate member 242 at a distance which is adjustable by means, for example, of adjusting nut 269. Disposed between the intermediate member 242 and the adjusting plate 268 is a helical compression spring 270 sized, configured and disposed so as to apply a reference force to the intermediate member 242 which, in turn, transmits said force to the force comparing means 254. Bearing means 272 are disposed between the first and second member. Preferably, the bearing means 272 includes a sealed ball bearing 274 maintained in its location by retaining ring 276.

In operation, when the first member is rotated with an applied torque below a predetermined level, said level called the trip torque, clutch 235 is in the position illustrated in FIG. 11 in which the torque is applied through the first member 240 to the intermediate member 242 and thereafter to the second member 252 causing it to conjointly rotate with the first member. However, when the torque exceeds the predetermined level, the axial force due to the torque applied to the main balls 256 causes said main balls to pivot about the edges 278, 280 of the registered recesses 258, 260, respectively, thereby driving the intermediate member 242 axially away from the second member 252 as the first member 240 continues its rotation relative to the second member 252. The main balls 256 totally vacate their recesses 258, 260 and the force comparing means 252 therefore assumes the position illustrated in FIG. 11 wherein the main balls 256 roll on opposing surfaces of the intermediate member 242 and the second member 252, respectively. Simultaneous with the above action of the force comparing means 254, the spline balls 246 rotate within their registered recesses 248 and 250 and, more specifically, pivotally about edges 282, 284, respectively (see FIG. 12), as the intermediate member 242 moves axially.

The spline means 244 thus illustrated has the advantage of reduced frictional levels relative to typical splines while serving a spline function and providing axial freedom and accommodation of axial as well as angular misalignment. In effect, the spline balls 246 act as rolling cams.

Thus, it can be readily appreciated that the spline means 244 and the force comparing means 254 act cooperatively during tripping of clutch 235, i.e., when the torque exceeds the predetermined trip torque level. It should be further easily appreciated from these simplified illustrations that the predetermined level of torque that results in tripping of the intermediate member 242 is determined by the magnitude of the reference force applied through the intermediate member 242 to the force comparing means 254.

Of importance is that the main balls 256 and the spline balls 246 pivot during tripping about the edges of their respective registered recesses 258, 260; 248, 250 which are each made to have an included angle of approximately 90°. Generally speaking, balls captured this way will reliably roll or pivot along the edges and, thus, when the intermediate member 242 kicks axially, the disengagement of clutch 235 is characterized by reduced frictional losses.

Thus, it should be understood that relative counter-rotation between the first and second members 240, 252 cause the intermediate member 242 to kick axially above the trip torque level which is established by the reference force. However, absent a latch means such as that shown in FIGS. 13A-13E, with continued rotation of the clutch 235, the intermediate member 242 will return to its axial position shown in FIG. 11 only to be kicked axially again when and if the applied torque exceeds the trip torque.

Returning now to the preferred embodiment, attention is directed to FIGS. 2 and 3. As an overload torque is applied to the clutch 10, intermediate assembly 14 kicks axially. Main balls 21 pivot about edges 182, 184 as the swing plate 80 (part of the intermediate assembly 14) moves apart from the cam plate 122 (part of the power take-off assembly 16). Elongate openings 90, 91 accommodate some swing as the legs 84 axially move therethrough. Each elongate opening 192 in a similar fashion permits some rotation of the swing plate 80 relative to cage 178, but limits the extent of the swing since it eventually contacts or hits the shank portion 187 of the stop means 185. After this contact, the main balls 21 can no longer roll (but rather slide) since the cage 178 is now rotationally secured to the swing plate 80. Further travel of the cam plate 122 disables the force comparing means 20 so that it no longer interconnects the intermediate assembly 14 and the power take-off assembly 16 and thus the clutch 10 is in its disengaged position wherein the shaft 26 does not drive the torque receiving means.

LATCH MEANS 24

The latch means 24, as can be seen in FIGS. 2, 3 and 13A-13E, includes a ring comprised of a plurality of latch balls 25, the latch plate 86, bearing surface 300 (which is the surface of spacer 140 distal from spacer 138) and the latch cup 34.

The ring of latch balls 25 is capable of moving in a radial direction ("dilating"), between its positions illustrated in FIGS. 13A through 13E. Each of the latch balls 25 is a discrete, spherical element mechanically contained to allow its rotation and radially-directed translational movement during dilation between its various positions.

FIG. 13A shows it in the engaged position wherein the latch balls 25 are disposed between the force generating means 22 and the intermediate assembly 14, and transmitting the reference force thereto. In this position, the latch balls 25 are held in an annular space, between and contacting the first inclined surface 110 of the latch plate 86, bearing surface 300, and the radially-inner cylindrical surface 301 of the axially-extending portion 56 of the latch cup 34. They form a "crowded" ring, i.e., a ring having a full complement of latch balls 25.

In the position shown in FIG. 13B, the latch balls 25 are disposed between and contained by bearing surface 300, the first inclined surface 110 of the latch plate 86 and an edge 302 of the latch cup 34. The latch balls 25 are preferably disposed such that a hypothetical plane normal to shaft 26 passing through the center of the latch balls 25 would also approximately pass through edge 302. The travel of the latch balls between the position shown in FIG. 13A and that shown in FIG. 13B can be called "preliminary travel".

In the position as shown in FIG. 13C, the latch balls 25 are contained between the bearing surface 300, the distal end 58 and an edge 304 defined by the join of the first and second inclined surfaces 110 and 112. The travel of the latch balls 25 between the positions of FIGS. 13B and 13C can be called the "active dilatory travel".

The position shown in FIG. 13D is marked by the latch balls 25 being disposed in an over-center fashion on the second incline surface 112 and being contained between bearing surface 300, the distal end 58 and the inclined surface 112. The travel of the latch balls 25 between the positions of FIGS. 13C and 13D can be called "over-travel". Both this position and that shown in FIG. 13C correspond to the disengaged position of the force comparing means 20.

The position shown in FIG. 13E is known as the "non-registration reset position" in which the latch balls 25 are disposed between the bearing surface 300 and both the distal end 58 and the first inclined surface 110.

OPERATION OF LATCH MEANS 24

With further reference to FIGS. 13A–13E, it should now be apparent that as the intermediate assembly 14 is kicked axially away from both the power take-off assembly 16 and the hub assembly 12, the latch balls 25 are driven up the first incline 110 by pinching action between the incline 110 and bearing surface 300. The latch balls 25 transmit the axial component of the force to which they are subjected to the force generating means 22 causing it to likewise move axially. Thus, the latch means 24 exhibits the position shown in FIG. 13A in the engaged position of the force comparing means 20 and moves to the position shown in FIG. 13B shortly after the commencement of axial movement of the intermediate assembly 14, and thereafter assumes the position shown in FIG. 13C during disengagement. Continued axial movement of the intermediate assembly 14 during disengagement causes the latch balls 25 to move to an over-centered position shown in FIG. 13D. Further radial dilation of the ring of latch balls 25 is prevented by the pinching action of the incline distal end 58 coacting on the latch balls 25 with bearing surface 300. Return axial movement of the intermediate assembly 14 is discouraged by the second incline surface 112 coacting with distal end 58 and bearing surface 300, since in order for the latch balls 25 to resume their pre-travel position shown in FIG. 13A, they must not only wedge about distal end 58 from bearing surface 300, but also effectively travel "up" (radially outwardly) the incline proffered by surface 112 and are inhibited from doing so by it and the angle on the distal end 58.

FORCE PATHS

To further understand the operation of clutch 10, a portion of the transmitted force paths through the clutch 10 shall now be traced with reference to FIGS. 2 and 3.

The path for transmitted torque when the clutch 10 is in its engaged position is as follows: shaft 26 to bushing 28 to hub 31 to backing plate 32 and latch cup 34 to spline balls 19 to latch plate 86 to legs 84 to swing plate 80 to main balls 21 to cam plate 122 and finally to the flange 120.

The reference force path in the engaged position of the clutch 10 can be traced as follows: from the force generating means 22 (i.e., as transmitted from the helical springs 164 to spring plate 137 to retaining ring 162 to spacers 138, 140) to latch balls 25 to latch plate 86 to legs 84 to swing plate 80 to main balls 21.

The torque transmission path in the disengaged position of the clutch 10 is interrupted by the disabling of the interconnection function of the force comparing means 20, and therefore flange 120 rotationally floats on the sealed ball bearing 135 connecting it with the nose 30 of the hub assembly 12. As torque is applied from shaft 26, the hub assembly 12 freely rotates independently of and relative to the power take-off assembly 16.

The reference force path in the disengaged position of the clutch 10 is from the force generating means 22 to the latch balls 25 to the latch cup 34. Thus, the reference force seen at the force comparing means 20 is zero, and continues to be so until the clutch 10 resumes its engaged position.

RESET

The clutch 10 is capable of being reset manually or automatically. Further, the clutch 10 optionally provides single-position reset, registration reset, as well as nonregistration reset. These shall now be discussed in detail.

Resetting of the clutch 10 manually to its engaged position is effected by the use of hand force, for example, by manually using an inexpensive tool such as a screwdriver or other simple lever (not shown). To reset the clutch 10, the intermediate assembly 14 is pushed back toward its engaged position, i.e., axially towards the power take-off assembly 16 and the hub assembly 12. This allows the ring of latch balls 25 to move radially inward, sliding and pivoting about edge 304 between the first and second incline surfaces 110, 112 as shown in FIG. 13E. As this occurs, the reference force is once again applied to the force comparing means 20. Reset sleeve 82 is pushed by hand during manual resetting or levered with the tool towards the power take-off assembly 16. Access for such a tool can be had through windows 310 in the reset sleeve 84 shown in FIGS. 1 and 3 so as to be able to manually pry the backing plate 32 and the swing plate 80 apart.

The intermediate assembly 14, however, can be moved axially in this manner even if the main balls 21 and registered recesses 114, 116 are not appropriately aligned. If not so aligned, there is yet sufficient room for resetting movement to allow latch balls 25 to assume a position known as the "non-registration reset position" as shown in FIG. 13E. In this position the latch balls 25 shunt a portion of the reference force to the intermediate assembly 14 as well as continue to apply the balance of the reference force to the hub assembly 12. With the arrangement shown in FIG. 13E, as an example, the reference force is approximately split equally between the two. With the latch in this position, the main balls 21 are pressed lightly against the cam plate 122. Rotation of shaft 26 when the latch balls 25 are in this position results in a resetting of the clutch 10 when the main balls 21 rotate into their aligned position with the recesses 114, 116. Upon alignment the intermediate assembly 14 snaps into engagement, thus completing the drive train.

This arrangement offers minimal drag of approximately 5% of the trip torque. Thus, non-registration reset does not require angular alignment prior to applying axial resetting force (as by the hand tool).

The manual reset can also be effected by aligning the recesses 114 and 116 prior to moving the intermediate assembly 14. This is known as registration reset. A window slot 312, shown in FIG. 1 and disposed in the reset sleeve 82 can be manually aligned with a mark 314 which indicates angular alignment. Thus, the invention contemplates facilitated angular realignment through easily used visual means.

Automatic reset is easily achieved in clutch 10 by the incorporation of sleeves 188 (see FIG. 14) in stop means 185 and the addition of axial limit means 311 (see FIG. 2).

The sleeves 188 are each disposed over shank portion 187. Since each has a larger diameter than the shank portion 187, the sleeves 188 contact the elongate openings 192 of the swing plate 80 (part of the intermediate assembly 14) at an earlier time in its swing during disengagement and, thus, limit the further swing of the intermediate assembly 14.

The axial travel limit means 311 limits the axial travel due to inertia of the intermediate assembly 14 during disengagement. This is particularly desireable for automatic reset. In manual reset without the axial travel limit means 311, the first inclined surface 110 limits axial travel by contacting the bearing surface 300. (Alternatively, head portion 186 of the stop means 185 can limit axial travel by contacting surface 193 of the swing plate and the backing plate 32.) For automatic reset, it is desireable to limit the intermediate assembly 14 to a shorter axial translation during disengagement. The axial travel limit means 311 achieves this.

The axial travel limit means 311 extends through and threadedly engages the spring plate 137 and during engagement extends therefrom towards but not to the latch plate 86. In disengagement, when the intermediate assembly 14 kicks axially, the axial travel limit means 311 can contact the latch plate 86 at a preselected axial translation thereof and thereby limit the axial translation of the intermediate assembly 14.

Cooperatively acting, the cage stop means 185, axial travel limit means 311 and their associated structure limit the swing and kick of the intermediate assembly 14 relative to the hub and power take-off assemblies 12, 16, and thereby permit automatic resetting of the clutch 10. They prevent the latch balls 25 from assuming their latched or "disengaged" position. Instead, the latch balls 25 directly assume their non-registration reset position. This permits, with continued relative rotation, the clutch 10 to reset automatically only to disengage if the applied torque continues to exceed the trip torque.

Single positioning reset, desireable in many applications, is a reset in which the intermediate assembly 14 assumes a single, angular position relative to the power take-off assembly 16 when engaged.

This is achieved through the incorporation in clutch 10, when such resetting is desired, of single-positioning pins 316 as shown in FIG. 2 and 10. A plurality of single positioning pins 316 are provided, each of which extend through aligned through-bores 318, 320, 322 in the latch cup 34, backing plate 32 and hub 31, respectively, and into a conical recess 324 in the cam plate 122. The conical recess 324 receives the pin 316 partially therein so as to provide a clearance fit thereabout both axially and radially.

Figure 8:
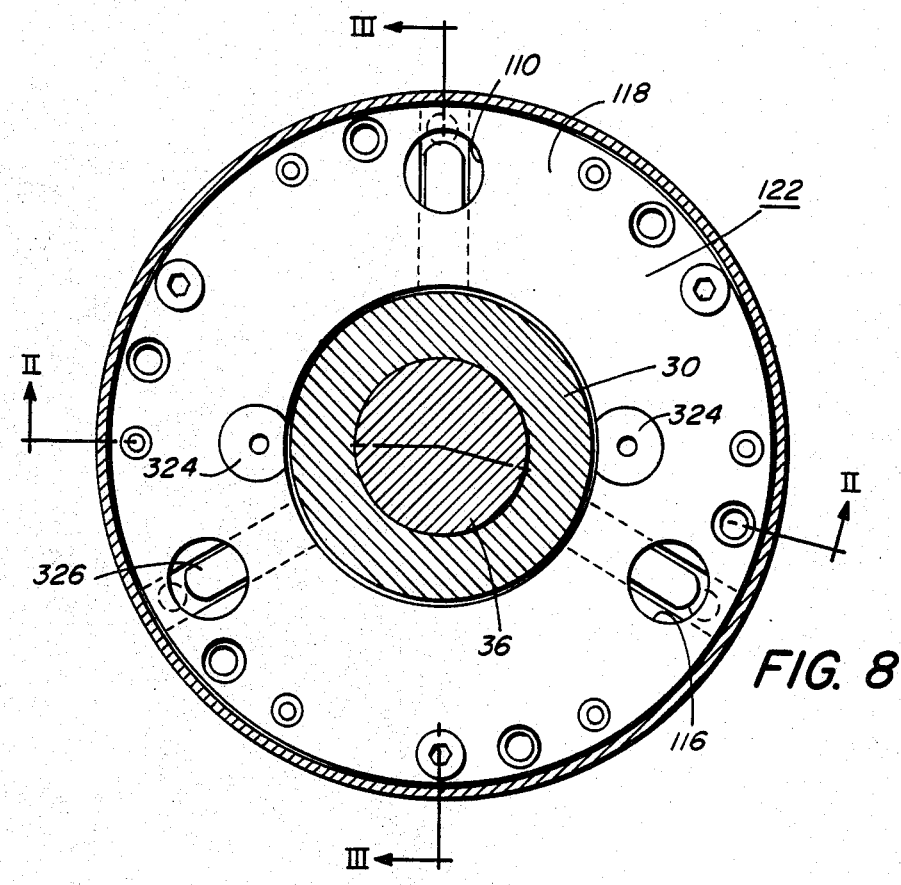
FIG. 8 is a sectional view with the main balls taken removed along line VIII—VIII of FIG. 1, this line's location also being indicated in FIGS. 2 and 3.

In the preferred embodiment, the clutch 10 has three equi-angularly spaced main balls 21 thus yielding three angular positions of engagement. To provide single-positioning reset, preferably two pins 316 are disposed 180° apart, as can be seen in FIG. 8, disposed loosely within the conical recess 324 at one end and within the intermediate assembly 14 at the other end. This allows only two positions per revolution for the intermediate assembly 14 to return to re-engagement, namely, a zero degree position and a position 180° therefrom. But the three main balls 21 prevent re-engagement of the intermediate assembly 14 at the latter position, thus permitting resetting on only a single angular position.

In automatic resetting with single positioning, the non-registration position of the latch balls 25 effects a reduction in the contact force of the single-positioning pins 316 against the cam plate 122 since part of the reference force is shunted in this position. Single positioning in automatic resetting provides a further advantage since the number of re-engagements during continued application of an overload torque over the trip torque are cut by two-thirds. This is true, of course, since only one of the three otherwise possible angular positions for reset is permitted.

It should be appreciated that single positioning can also be achieved in manual resetting of the clutch 10 by manually aligning the mark 314 in window 312. However, single position resetting with the single-positioning pins 316 can also be adapted for manual resetting clutches to prevent resetting in other than the angularly-preferred position without the need to align, for example, the mark 312 and window 314.

For single-positioning reset, biasing means 326, for example, as shown in FIG. 8 as being flat springs, are disposed in each of the recesses 116 to avoid the main balls 21 from accidentally falling into the recess 116 at other than the angular position permitted by combined action of the single-positioning pins 316 and the main balls 21. Absent such biasing means 326, gravity, vibration or other operating circumstances might prompt the main balls 21 to do so. (It is to be noted, an undesireable cam system would form which would require considerably reduced trip torque to produce disengagement.)

OTHER FEATURES

One skilled in the art can appreciate that other features, elements or structures can be added to the disclosed clutch 10 for particular applications or to facilitate its operation. One such feature not previously discussed herein is calibrated window 330 which is an elongate bore through the housing sleeve 136 shown in FIG. 1. An edge of the adjusting cup 146 is visible through the window so as to be able to calibrate its position and therefore the reference force which is dependent thereon.

A variety of features can be added as accessories to clutch 10 to adapt it to particular applications. For example, an optional accessory is a limit switch actuator plate 332 shown in FIGS. 1 and 3. The actuator plate 332 is a radially extending annulus disposable concentrically about the housing sleeve 136 and extending radially therefrom. It is maintained in this position by retaining rings 334 and 336, one disposed on either side of the actuator plate 332. The actuator plate 332 is adapted to be used to sound an alarm or shut down the machinery (not shown) to which the clutch is coupled. During its disengagement of clutch 10, the intermediate assembly 14 drives the housing sleeve 136 axially thereby axially translating the actuator plate 332. It is this motion that can be used most readily for a limiting switch. Though not shown, a similar plate can be similarly mounted to the reset sleeve 82 for remote resetting of an otherwise manual reset clutch, (i.e., clutch 10 not equipped with the sleeves 188 and axial limiting means 311) using an external actuator (not shown) to displace the intermediate assembly 14 from its disengaged to its engaged position.

KINEMATIC SENSITIVITY

Figure 15:
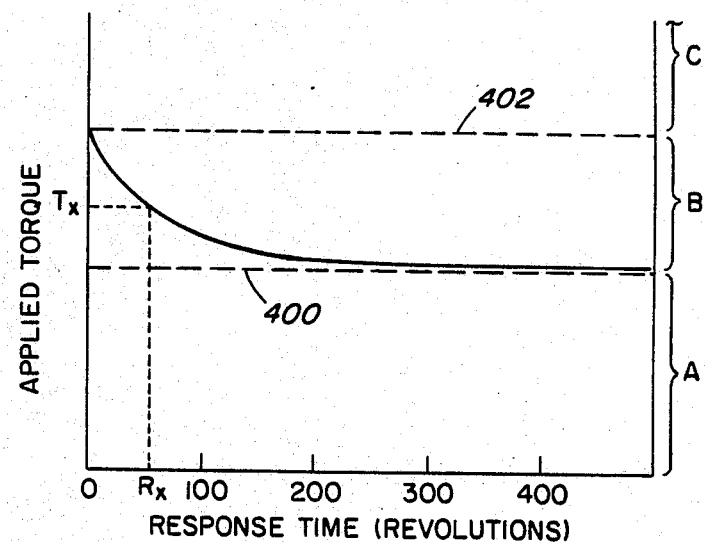
FIG. 15 is a graph on which is plotted applied torque as a function of response time in revolutions of a clutch.

FIG. 15 is a graph on which is plotted the applied torque against the trip response time in revolutions for a clutch typical of the prior art.

Some researchers in the area of torque overload release clutches have assumed that the clutch's trip response exhibits speed sensitivity. The inventor has discovered that rather than being speed sensitive, clutches of this type exhibit rotary travel sensitivity. The level of trip torque required to disengage the clutch varies depending on the number of revolutions endured at a particular torque. Thus, conventional torque limiting clutches can be considered to have a range of trip torques bounded by the Static Limit at one end and the Kinematic Limit at the other (excluding dynamic effects). The Static Limit is the overload torque required for instantaneous disengagement which is also the trip torque required at zero rpm. The Kinematic Limit is the torque which will trip the clutch after an infinite (very large) number of revolutions, which can also be labeled "Kinematic torque", or "holding torque". In FIG. 15, the line designated 400 is the Kinematic Limit, while the line designated 402 is the Static Limit. The plotted curve represents the clutch response curve, i.e., the number of revolutions necessary to disengage the clutch at each level of overload torque. This curve has a negative slope which goes toward zero as it approaches the Kinematic Limit. At zero revolutions the applied torque equals the Static Trip Torque and above 200 revolutions it is approximately, though just over, the Kinematic Limit. It can be readily appreciated by one skilled in the art that larger overloads produce shorter delays in response, i.e., the clutch trips faster. It should likewise be appreciated that the Kinematic Limit can be a small fraction of the Static Limit. For example, if that fraction were 50%, an overload would have to be double the maximum possible running torque in order for the clutch to release quickly. For the same situation, a slight overload may require, for example, 100 revolutions to disengage the clutch.

Clutch design affects the magnitude of the Kinematic Limit and the Static Limit as well as the slope (i.e., response time) of the curve.

Referring to the graph, Region A is the torque range from zero to the Kinematic Limit. In this region the clutch will not release no matter how many revolutions, and is the normal "Operating range" for driving the torque receiving means.

Region B is bounded by the Kinematic Limit and the Static Limit. Here the clutch 10 will trip, while not necessarily instantaneously. The torque Tx corresponding to 50 revolutions is plotted as approximately midway between the Kinematic Limit and the Static Limit. It would take 50 revolutions to trip the clutch at this overload level of applied torque.

In Region C, disengagement of the clutch 10 is instantaneous since the applied torque here is equal to or greater than the Static Trip Torque.

This sensitivity of a torque overload release clutch to revolutions is what has been called herein "Kinematic Sensitivity".

Made in accordance with the invention, the clutch 10 incorporates elements, features, and structures which reduce the frictional losses experienced in disengagement compared to those suffered by conventional clutches. In so doing, the Kinematic Limit was raised to approximate (within ten percent) the Static Limit and, thus, the response time, as well as the minimum overload required for instant tripping was reduced. This was accomplished in clutch 10 by, for example, incorporation of the spline means 18, force comparing means 20 and latch means 24 described in detail hereinabove.

While the preferred embodiment has been described in detail, it should be understood that changes can be made thereto without departing from the spirit of the invention. For example, the ring of latch balls could be replaced with a garter spring, or the helical springs could be replaced by other biasing means. Likewise, while the shaft has been identified as the torque transmitting means, the present invention can be practiced by connecting the torque transmitting means to the power take-off assembly 16 and thus the shaft becomes the force receiving means. In general, it is intended that all matter contained in the above description or in the accompanying drawings shall be interpreted in an illustrative and not in a limiting sense.

I claim:

1. A torque limiting device comprising a rotatable first assembly, an intermediate assembly, a second assembly, first means for drivingly interconnecting said first assembly to said intermediate assembly for rotation therewith, second means for disengageably drivingly interconnecting said intermediate assembly to said second assembly for rotation therewith, said second means including a plurality of circumferentially spaced main balls each at least partially disposable within a pair of recesses defined by said intermediate and second assemblies, means for generating a reference force, and bearing means for connecting the first and second assemblies while permitting relative rotation therebetween, said second means being responsive to said reference force for disengaging said intermediate assembly from said second assembly when the axially directed force due to the torque applied thereto exceeds the reference force, and wherein said first means includes a plurality of spline balls each at least partially disposed in angularly spaced angularly relation one to another and separately from one another within registrable recesses defined by the first assembly and the intermediate assembly.

2. The torque limiting device of claim 1 wherein, during disengagement, the intermediate assembly moves axially away from both said first and second assemblies while said main balls vacate said recesses in the intermediate and second assemblies.

3. The torque limiting device of claim 1 further including means for latching the intermediate assembly in its disengaged position.

4. The torque limiting device of claim 3 wherein the latch means includes a dilatable ring of bearing balls.

5. A torque limiting device comprising a rotatable first assembly, an intermediate assembly, a second assembly, first means for drivingly interconnecting said first assembly to said intermediate assembly for rotation therewith, second means for disengageably drivingly interconnecting said intermediate assembly to said second assembly for rotation therewith, means for generating a reference force, said second means being responsive to said reference force for disengaging said intermediate assembly from said second assembly when the axially directed force due to the torque applied thereto exceeds the reference force, wherein said first means includes a plurality of bearing balls disposed in circumferentially spaced relation one to another between the first assembly and the intermediate assembly, and means for latching the intermediate assembly in its disengaged position including a dilatable ring of bearing balls, wherein the latch means in a first position interconnects the reference force generating means with the intermediate assembly and thereby only transmitting the reference force thereto; and in a second position interconnects the reference force generating means with the first assembly thereby only transmitting the reference force thereto, and thereby substantially reducing the reference force at the responsive means and maintaining the disengagement of the intermediate assembly.

6. The torque limiting device of claim 5 wherein the ring of latch balls can assume a third position wherein the reference force is transmitted to both the first assembly and the intermediate assembly.

7. The torque limiting device of claim 1 wherein the responsive means includes a plurality of bearing balls disposed in circumferentially spaced relation one to another with each disposable in registered recesses located in the intermediate and second assemblies.

8. The torque limiting device of claim 1 wherein the generating means comprises first and second spaced plates, said second plate connectable to the second assembly for transmitting the reference force thereto, a plurality of compression springs disposed in circumferentially spaced relation one to another between said first and second plates, and means for adjusting the distance between said plates and thereby the compression of said compression spring.

9. The torque limiting device of claim 8 wherein the adjusting means includes a plurality of adjusting screws, and a plurality of stand-offs connected to said second plate, disposed circumferentially between said springs, and connected to said first plate by said adjusting screws.

10. A torque limiting device comprising a rotatable first assembly; an axially movable intermediate assembly; a second assembly; first means for drivingly interconnecting said first assembly to said intermediate assembly for rotation therewith, said first means comprising a plurality of circumferentially spaced balls each contained in registered recesses located in the first and intermediate assemblies; second means for disengageably drivingly interconnecting said intermediate assembly to said second assembly for rotation therewith, said second means including a plurality of circumferentially spaced balls each contained in registered recesses located in the intermediate and second assemblies; means for generating a reference force, and wherein, when the axial force due to the torque applied to the first assembly exceeds the reference force, the intermediate assembly is moved axially away from the second assembly.

11. The torque limiting device of claim 10 further including means for limiting the rotation during disengagement of the intermediate assembly relative to the first assembly.

12. The torque limiting device of claim 10 further including means for limiting the axial movement during disengagement of the intermediate assembly relative to the first assembly.

13. A torque limiting device comprising a rotatable first assembly; an intermediate assembly; a second assembly; first means for drivingly interconnecting said first assembly to said intermediate assembly for rotation therewith, second means for disengageably drivingly interconnecting said intermediate assembly to said second assembly for rotation therewith, said second means being responsive to reference force for disengaging said intermediate assembly from said second assembly when the axially directed force at said second means due to the torque applied to the device exceeds the reference force; and means for latching the intermediate assembly in its disengaged position, said means comprising a ring radially dilatable between (i) a first position in which the ring interconnects a force generating means with the intermediate assembly thereby transmits the reference force thereto until disengagement of the intermediate assembly, and (ii) a second position in which the ring interconnects the reference force generating means with the first assembly and thereby transmits the reference force thereto, whereby reference force at the second means is substantially reduced and the intermediate assembly is maintained in disengagement from the first assembly.

14. The torque limiting device of claim 13 wherein the ring is further dilatable to a third position radially intermediate the first and second positions, in which the reference force is transmitted to both the first assembly and the intermediate assembly.

15. The torque limiting device of claim 14 wherein the ring is defined by a plurality of latch balls.

16. The torque limiting device of claim 15 wherein the latch balls are disposed: (i) in the first position, between a bearing surface of the force generating means and a first surface of the intermediate assembly; (ii) in the second position, between said bearing surface and a first surface of the first assembly; and (iii) in the third position, between said bearing surface and both said first surface of the intermediate assembly and said first surface of said first assembly.

17. A torque overload release clutch comprising an input assembly; an output assembly; an intermediate assembly; means for generating a reference force; first means responsive to said reference force for drivingly interconnecting the intermediate assembly and the output assembly when the axial force at the first means due to torque applied to the input assembly is less than the reference force and for disengaging the intermediate assembly from the output assembly when the axial force at the first means due to torque applied to the input assembly is greater than the reference force; second means drivingly interconnecting the input assembly to the intermediate assembly when the intermediate assembly is drivingly connected to the output assembly by the first means; means for maintaining the intermediate assembly in disengagement; and means for limiting the rotation of the intermediate assembly relative to the output assembly during disengagement of the intermediate assembly, wherein both the first and second means includes a plurality of bearing balls, each ball at least partially disposable within a different pair of a plurality of associated first and second recesses of circular cross-section disposed in the intermediate and output assemblies, respectively, for the bearing balls of the first means and in the input and intermediate assemblies, respectively, for the bearing balls of the second means.

18. The torque overload release clutch of claim 17 wherein the intermediate assembly includes a portion having a plurality of circumferentially-extending elongate openings extending therethrough; the rotation limiting means comprises an annular cage disposed between the intermediate assembly and the output assembly, said cage having a plurality of circumferentially-spaced bores therethrough; a plurality of circumferentially-spaced legs, each fixedly connected to said cage and extending orthogonally therefrom and through one of the elongate openings with a clearance fit; wherein each of the plurality of balls, of the first means is disposable in one of the cage's bores with a clearance fit; wherein, when the axial force due to the torque exceeds the reference force, the balls of the first means vacate their recesses and drive the intermediate assembly axially while it rotates relative to the output assembly, said rotation continuing until the legs contact the intermediate assembly within the elongate openings.

19. The torque overload release clutch of claim 18 further including means for limiting the rotation of the intermediate assembly relative to the input assembly.

20. The torque overload release clutch of claim 18 wherein the intermediate assembly inlcudes a first portion having a first surface, and the output assembly includes a second portion having a second surface substantially parallel to the first surface; and wherein the first and second recesses are each defined by cylindrical walls extending orthogonally from the first and second surfaces and into the first and second portions, respectively.

21. The torque overload release clutch of claim 18 further comprising means for connecting the input assembly to a drive shaft, wherein the connecting means includes a tapered bushing disposed within a bore defined by the input assembly and between the input assembly and the shaft.

22. The torque overload release clutch of claim 18 further including limit switch actuating means.

23. A torque overload release clutch comprising an input assembly; an output assembly; an intermediate assembly; means for generating a reference force; first means responsive to said reference force for drivingly interconnecting the intermediate assembly and the output assembly when the axial force at the first means due to torque applied to the input assembly is less than the reference force and for disengaging the intermediate assembly from the output assembly when the axial force at the first means due to torque applied to the input assembly is greater than the reference force; second means for drivingly interconnecting the input assembly to the intermediate assembly when the intermediate assembly is drivingly connected to the output assembly by the first means; means for maintaining the intermediate assembly in disengagement; and means for disabling the maintaining means whereby the intermediate assembly after disengagement is automatically re-engaged and drivingly interconnected with the output assembly when the axial force due to the torque become less than the reference force.

24. A torque overload release clutch comprising an input assembly; an output assembly; an intermediate assembly; means for generating a reference force; first means responsive to said reference force for drivingly interconnecting the intermediate assembly and the output assembly when the axial force at the first means due to torque applied to the input assembly is less than the reference force and for disengaging the intermediate assembly from the output assembly when the axial force at the first means due to torque applied to the input assembly is greater than the reference force; second means for drivingly interconnecting the input assembly to the intermediate assembly when the intermediate assembly is drivingly connected to the output assembly by the first means; means for maintaining the intermediate assembly in disengagement; wherein the maintaining means comprises a dilatable ring disposable in a first position between the reference force generating means and the intermediate assembly for transmitting the reference force therebetween, and in a second position between the reference force generating means and the input assembly for transmitting the reference force therebetween.

25. The torque overload release clutch of claim 24 wherein the dilatable ring is disposable in a third position between the reference force generating means and both the input assembly and the intermediate assembly for transmitting the reference force to both said assemblies.

26. An overload release clutch comprising:
(a) a hub assembly including a first plurality of circumferentially spaced recesses defined thereby;
(b) an intermediate assembly including a first and second plurality of circumferentially spaced recesses defined thereby;
(c) a power take-off assembly including a first plurality of circumferentially spaced recesses defined thereby;
(d) spline means for drivingly interconnecting said hub assembly with said intermediate assembly, said spline means including a plurality of spline balls, each of said plurality of spline balls at least partially disposed within a different one of said first plurality of recesses of said hub assembly and a different one of said first plurality of recesses of said intermediate assembly, which ones form an associated pair of spline recesses;
(e) force comparing means for releasably, drivingly interconnecting said intermediate assembly with said power take-off assembly, including a plurality of main balls, each of said plurality of main balls at least partially disposable within a different one of said second plurality of recesses of said intermediate assembly and a different one of said first plurality of recesses of said power take-off assembly, which ones form an associated pair of main recesses;
(f) means for generating a reference force; and
(g) latch means comprising a radially expandable ring of latch balls disposable for transmitting said reference force (1) in a first position thereof to said intermediate assembly through which it is transmitted to the force comparing means, and (2) in a second position thereof, to the hub assembly;
whereby below a set torque the clutch is in engagement and forms a drive train adapted and configured so as to transmit torque from the hub assembly through the intermediate assembly and to the power take-off assembly, and above said set torque the clutch is in disengagement and does not transmit said torque from said hub assembly to said power take-off assembly.

27. The overload release clutch of claim 26 wherein the latch balls are disposable in a third position thereof to transmit said reference force to both said intermediate assembly and said hub assembly.

28. The overload release clutch of claim 26 wherein the hub assembly further includes:

(a) a bushing attachable to a shaft for rotation therewith;

(b) a hub fixedly attached to said bushing;

(c) a backing plate including said first plurality of recesses of said hub assembly;

(d) a latch cup abutting said backing plate, and including an annulus and a portion directed away from said backing plate and ending in an inclined surface against which said latch balls bear in said second position of said latch means;

(e) means for attaching said latch cup and said backing plate to said hub; and (f) a plurality of stand-offs, each comprising a right cylindrical tube adapted and configured to cooperate with means for adjusting said reference force, and means for attaching said tube to said backing plate.

29. The overload release clutch of claim 28 wherein said intermediate assembly further includes:

(a) a swing plate including said second plurality of recesses of said intermediate assembly;

(b) a latch plate disposed in spaced, generally parallel relation relative to said backing plate, and including (1) an inclined surface against which said latch balls bear in said first position of said latch means, (2) a plurality of elongate openings each sized and configured to receive therethrough said tube of one of said plurality of stand-offs, and (3) said first plurality of recesses of said intermediate assembly, wherein each of said first plurality of recesses of said latch plate forms one of said associate pair of spline recesses with one of said first plurality of recesses in said backing plate with which it is angularly and radially registrable;

(c) means for connecting said latch plate to said swing plate comprising a plurality of circumferentially spaced legs each including a right cylindrical tube, disposed with a clearance fit through elongate openings defined in said latch cup and in said backing plate, and means for securing said latch plate to said swing plate; and (d) a reset sleeve comprising a right cylindrical tube connected to said swing plate.

30. The overload release clutch of claim 29 wherein said power take-off assembly further includes:

(a) a cam plate disposed in spaced, generally parallel relation relative to said swing plate, said cam plate defining said first plurality of recesses of said power take-off assembly, each of said plurality of recesses of said cam plate forming one of said associate pairs of main recesses with one of said recesses in said backing plate with which it is angularly and radially registrable;

(b) a flange fixedly connected to said cam plate;

(c) bearing means for connecting said flange to said hub assembly while allowing relative rotation therebetween; biasing each of said main balls toward said (d) means for biasing each of said main balls toward said swing plate.

31. The overload release clutch of claim 30 wherein said reference force adjusting means includes (a) a spring plate;

(b) an adjusting cup disposed in spaced parallel relation relative to said spring plate, and (c) means for permitting manual adjustment of the distance between said adjusting cup and said spring plate and for securing said adjusting cup to said stand-offs; and and wherein said reference force generating means further includes: a bearing wall disposed for transmitting said reference force to said latch balls; and means for biasing said spring plate away from said adjusting cup.

32. The overload release clutch of claim 30 further including: a cage disposed between said swing plate and said cam plate, and defining a plurality of circumferentially spaced bores therethrough each sized to receive therein a portion of one of said plurality of main balls with a clearance fit, each of said plurality of bores being angularly and radially registrable with one of said associated pairs of main recesses.

33. The overload release clutch of claim 30 wherein each of said associated pairs of main recesses in combination with one of said plurality of main balls define a cam system sized and configured to permit, during transmission of torque and relative rotation between said hub assembly and said power take-off assembly, first a rolling and then a sliding action of said one of said plurality of main balls about edges of said associated pair of main recesses.

34. The overload release clutch of claim 30 wherein each associated edges in cross-section has generally square corners.

35. The overload release clutch of claim 34 wherein the combination of said one main ball and said edges, during engagement and when the set torque is exceeded, form a cam angle of approximately twenty-five degrees with respect to a plane directed perpendicularly to said first axis, and said one main ball rotates during the commencement of disengagement as the cam angle increases until the cam angle reaches an angle in the range of approximately 45° to 65° and thereafter said one main ball slides, whereby the clutch during the process of disengagement is characterized by reduced frictional losses.

36. The overload release clutch of claim 33 wherein said main balls slide instead of pivot as the edges of the associated pairs of main recesses contact said main balls at points approximately 180° apart.

37. The overload release clutch of claim 32 further including: a plurality of cage stop means each including a head and a generally cylindrical portion attached at one of its ends to said cage and at the other to said head, and each extending through one of a plurality of elongate openings defined in said swing plate, with one dimension of each of said plurality of elongate openings being less than the diameter of said head but greater than that of said cylindrical portion.

38. The overload release clutch of claim 37 further including a plurality of sleeves, each disposable concentrically over said cylindrical portion of one of said plurality of cage stops and sized relative to said elongate opening so as to permit automatic resetting of the clutch after said set torque has been exceeded.

39. The overload release clutch of claim 29 wherein each of said plurality of spline balls are at least partially disposed within said associated pair of spline recesses and within a through bore defined in said latch cup.

40. The overload release clutch of claim 33 wherein, when a torque above the set torque is applied to said hub, said intermediate assembly kicks axially, said plurality of main balls pivot about edges of said main recesses as said swing plate moves apart from said cam plate with said cage stop means limiting the relative rotation of said swing plate relative to said cage, at which limit further travel of said cam plate disables said force comparing means, whereby said clutch is in its disengaged position.

41. The overload release clutch of claim 26 wherein said ring of latch balls includes a full complement of latch balls in at least one of said latch means' positions.

42. The overload release clutch of claim 26 wherein when the clutch is in its disengaged position said latch balls are in said second position thereof.

43. The overload release clutch of claim 26 wherein said clutch is in its engaged position when said latch means is in its first position and said clutch is in its disengaged position when said latch is in its second position.

44. The overload release clutch of claim 30 wherein torque below said set torque is transmitted as follows: said bushing to said hub to said backing plate to said latch cup to said spline balls to said latch plate to said legs to said swing plate to said main balls to said cam plate to said flange.

45. The overload release clutch of claim 30, wherein when torque is below said set torque, said reference force is transmitted from said force generating means to said latch balls to said latch plate to said legs to said main balls.

46. The overload release clutch of claim 26 wherein said clutch, after it is in its disengaged position, can be reset by manually pushing said intermediate assembly towards said power take-off assembly without manually angularly aligning said plurality of main balls with said associated main recesses.

47. The overload release clutch of claim 27 wherein, when said clutch is in disengagement, said latch balls are in said third position and a torque is applied to said clutch, said plurality of main balls will return to said associated recesses as said power take-off assembly rotates relative to said intermediate assembly.

48. The overload release clutch of claim 27 wherein said clutch is in disengagement and the intermediate assembly is manually pushed toward said power take-off assembly, said latch balls move from said second position thereof to said third position thereof whereby continued rotation of said power take-off assembly relative to said intermediate assembly will effect re-engagement.

* * * * *